United States Patent
Badoil

(10) Patent No.: US 12,202,339 B2
(45) Date of Patent: Jan. 21, 2025

(54) REMOTE CONTROL FOR VEHICLE INTERFACE

(71) Applicant: TOYOTA MOTOR EUROPE, Brussels (BE)

(72) Inventor: Aurélien Badoil, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 279 days.

(21) Appl. No.: 17/793,182

(22) PCT Filed: Jan. 15, 2020

(86) PCT No.: PCT/EP2020/050875
§ 371 (c)(1),
(2) Date: Jul. 15, 2022

(87) PCT Pub. No.: WO2021/144014
PCT Pub. Date: Jul. 22, 2021

(65) Prior Publication Data
US 2023/0053331 A1 Feb. 23, 2023

(51) Int. Cl.
*B60K 35/00* (2024.01)
*B60K 35/10* (2024.01)
(Continued)

(52) U.S. Cl.
CPC ............ *B60K 35/00* (2013.01); *B60K 35/10* (2024.01); *B60K 35/60* (2024.01); *B60K 35/80* (2024.01);
(Continued)

(58) Field of Classification Search
CPC ........ B60K 2360/774; B60K 2360/126; B60K 35/60; B60K 35/10; B60K 2360/143; B60K 2360/55; B60K 35/80; B60K 35/00
(Continued)

(56) References Cited

U.S. PATENT DOCUMENTS

2008/0238874 A1* 10/2008 Yamamoto ............. B60K 35/10
345/163
2015/0327803 A1* 11/2015 Fujita ....................... A61B 5/18
340/576
(Continued)

FOREIGN PATENT DOCUMENTS

DE   10 2018 202 657 A1   8/2019
JP        2018-169758 A   11/2018
(Continued)

OTHER PUBLICATIONS

Sep. 21, 2020 Search Report issued in International Patent Application No. PCT/EP2020/050875.
(Continued)

*Primary Examiner* — Yazan A Soofi
(74) *Attorney, Agent, or Firm* — Oliff PLC

(57) ABSTRACT

A remote control an automotive vehicle, the remote control including a 3-D shaped object, stretch sensors connecting the 3-D shaped object to a structure of the vehicle and a control unit configured to collect information from the stretch sensors, the remote control being configured to control a display of the automotive vehicle, the remote control being configured to be integrated in a stretchable fabric part of an interior of the vehicle.

12 Claims, 4 Drawing Sheets

(51) Int. Cl.
*B60K 35/60* (2024.01)
*B60K 35/80* (2024.01)
(52) U.S. Cl.
CPC .. *B60K 2360/126* (2024.01); *B60K 2360/143* (2024.01); *B60K 2360/55* (2024.01); *B60K 2360/774* (2024.01)
(58) Field of Classification Search
USPC .......................................................... 701/36
See application file for complete search history.

(56) References Cited

U.S. PATENT DOCUMENTS

2018/0272960 A1* 9/2018 Hwang ............... B60R 13/0212
2018/0302983 A1* 10/2018 Osorio Dinis ........ G06F 3/0445

FOREIGN PATENT DOCUMENTS

WO   2018/013557 A1   1/2018
WO   2018/179907 A1   10/2018

OTHER PUBLICATIONS

Sep. 21, 2020 Written Opinion of the International Searching Authority issued in International Patent Application No. PCT/EP2020/050875.

* cited by examiner

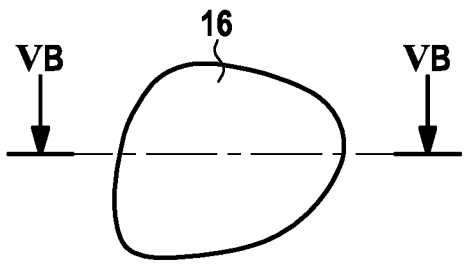
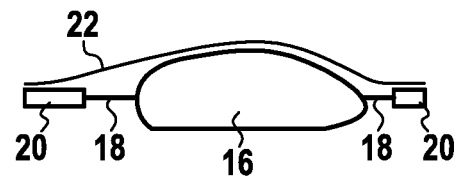
FIG.5A  FIG.5B
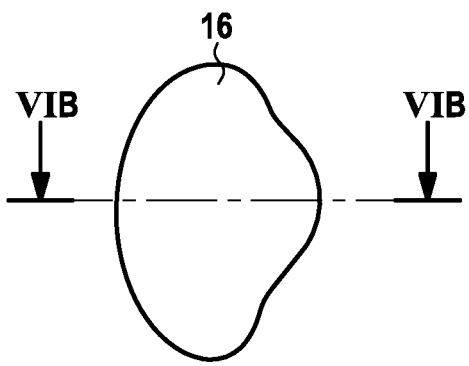
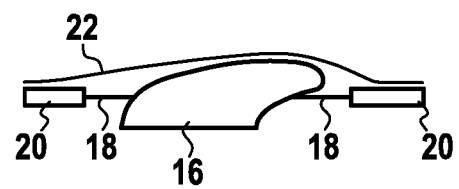
FIG.6A  FIG.6B
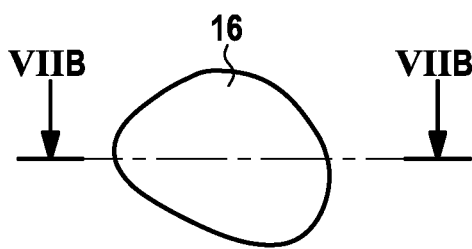
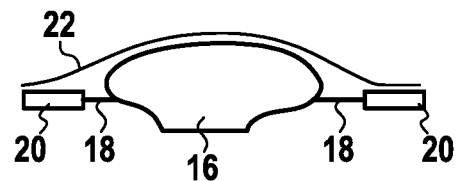
FIG.7A  FIG.7B

REMOTE CONTROL FOR VEHICLE INTERFACE

TECHNICAL FIELD

The present disclosure is related to a remote control for an automotive vehicle, and more particularly to a remote control to control a display of the automotive vehicle.

BACKGROUND

Remote control to control a display of an automotive vehicle may comprise buttons and/or switches.

To select an option on the display, a user may turn the button and/or push the button or the switch.

However, these buttons/switches generally take space and require connections and to be integrated on a hard console.

SUMMARY

Therefore, according to embodiments of the present disclosure, a remote control for an automotive vehicle is provided. The remote control may include a 3-D shaped object, stretch sensors connecting the 3-D shaped object to a structure of the vehicle and a control unit configured to collect information from the stretch sensors, the remote control being configured to control a display of the automotive vehicle, the remote control being configured to be integrated in a stretchable fabric part of an interior of the vehicle.

By providing such a configuration, it is possible to provide the user with a physical, tangible object, i.e., the 3-D shaped object, that the user may grasp to select an option on the display and to perform the selected option. It is possible to provide a seamless integration of a complex remote control in the interior design of an automotive vehicle.

Non-limiting examples of stretch sensors may include conductive rubber, for example silicon based dielectric electro-active polymer or conductive fabric, such as silver plated nylon.

Non-limiting examples of materials for the 3-D shaped object may include polymer materials, wood, metal.

According to some embodiments, the connecting stretch sensors may be radially disposed around the 3-D shaped object.

According to some embodiments, the 3-D shaped object may be sandwiched between two stretch fabric layers.

According to some embodiments, the 3-D shaped objet may include a recess covered with a weaving of stretch sensors so as to allow deformation of the weaved stretch sensors into the recess, the control unit being configured to collect information from the weaved stretch sensors.

According to embodiments of the present disclosure, an automotive vehicle is provided. The automotive vehicle may include an above-defined remote control integrated in a stretchable fabric part of an interior of the vehicle.

According to some embodiments, the remote control may be integrated in an armrest.

According to some embodiments, the remote control may be integrated in a center console.

According to embodiments of the present disclosure, a method of remote control of a display of an above-defined automotive vehicle is provided. The method may include:
grasping the 3-D shaped object;
deforming the stretch sensors by interacting with the 3-D shaped object;
collecting information on deformation of the stretch sensors by the control unit;
sending collected information by the control unit to a vehicle system controlling the display.

According to some embodiments, deforming the stretch sensors may include rotating the 3-D shaped object.

According to some embodiments, deforming the stretch sensors may include pressing the 3-D shaped object.

According to some embodiments, deforming the stretch sensors may include translating the 3-D shaped object.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIGS. 5-7 show other exemplary remote control according to embodiments of the present disclosure.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
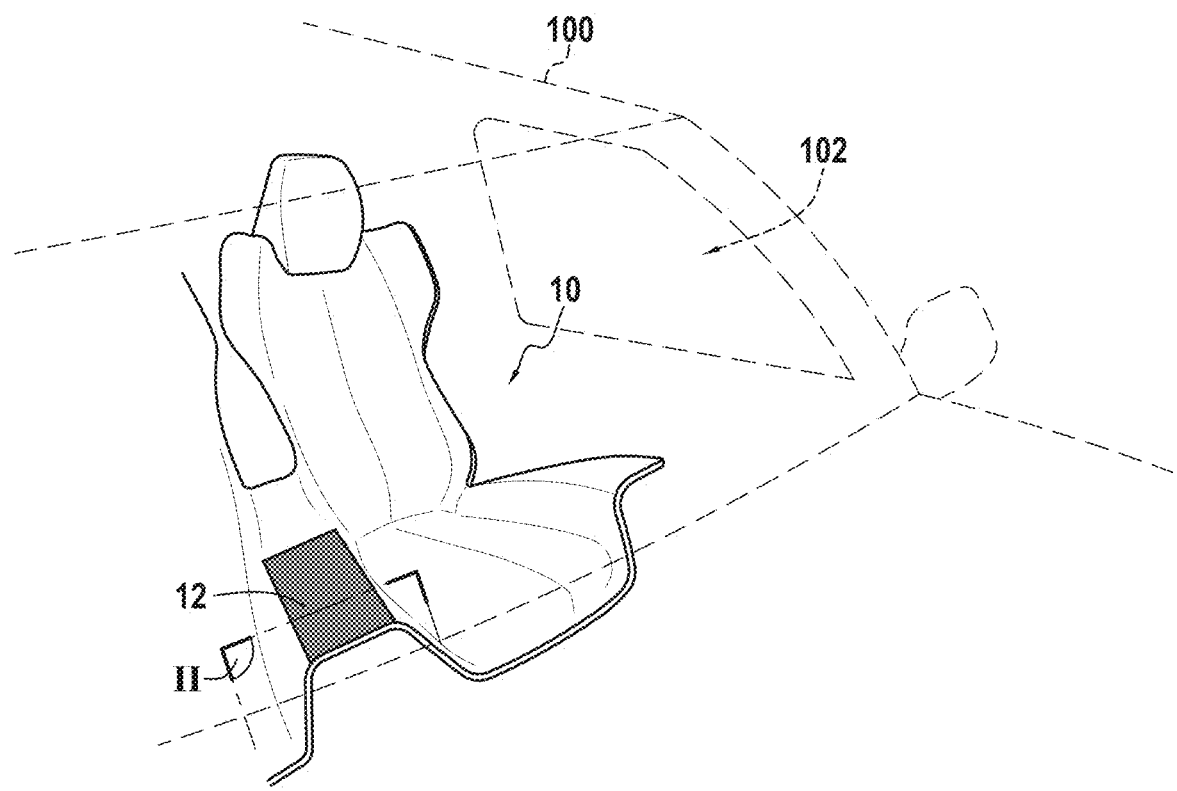
FIG. 1 shows a partial representation of an exemplary automotive vehicle according to embodiments of the present disclosure.

FIG. 1 shows a partial representation of an exemplary automotive vehicle 100 according to embodiments of the present disclosure.

The automotive vehicle 100 may include an interior 102. The interior 102 may include seats 10. The seat 10 may include a stretchable fabric part 12.

As a non-limiting example, the stretchable fabric part 12 may be an armrest.

As a non-limiting example, the stretchable fabric part 12 may be a center console.

Figure 2:
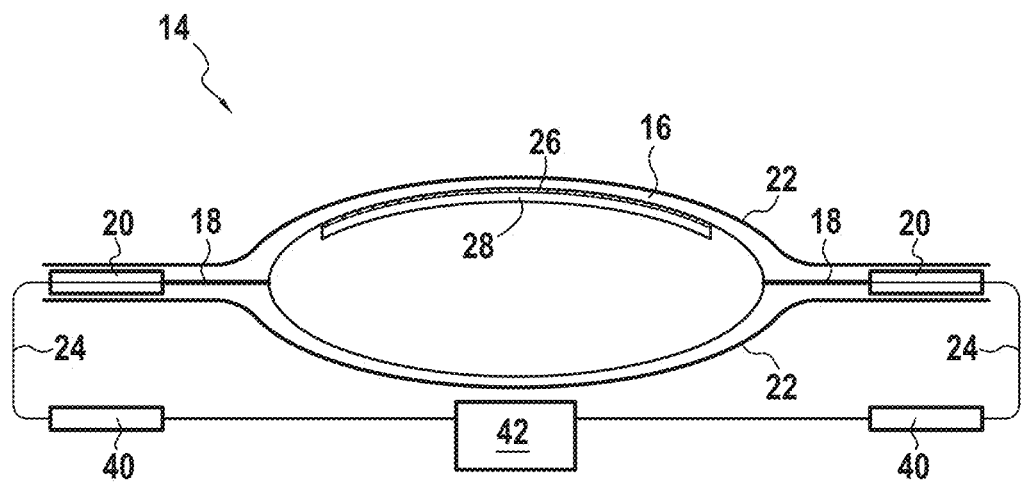
FIG. 2 shows a cross-section of an exemplary remote control according to embodiments of the present disclosure.

As shown in FIGS. 1 and 2, the stretchable fabric part 12 may include two layers of stretch fabric 22. It is understood that the number of layers of stretch fabric 22 is a non-limiting example.

The automotive vehicle 100 may include a remote control 14 integrated in the stretchable fabric part 12. The remote control 14 may be configured to control a display of the automotive vehicle 100. The display may be to control a multimedia system or a HVAC system (heating, ventilation and air-conditioning).

The remote control 14 may include a 3-D shaped object 16 and stretch sensors 18 connecting the 3-D shaped object 16 to a structure 20 of the vehicle 100. The structure 20 of the vehicle is a fixed structure 20 relative to the stretchable fabric part 12. The remote control 14 may include a control unit 40 configured to collect information from the stretch sensors 18.

As a non-limiting example, the 3-D shaped object 16 has a symmetrical shape in view from the top or in cross-section.

As shown in FIG. 2, the remote control 14 may include more than one control unit 40. As a non-limiting example, all the connecting stretch sensors 18 may be connected to one control unit 40.

As shown in FIG. 2, the 3-D shaped object 16 may include a recess 28 covered with a weaving of stretch sensors 26 so as to allow deformation of the weaved stretch sensors 26 into the recess 28, the control unit being configured to collect information from the weaved stretch sensors.

Figure 3:
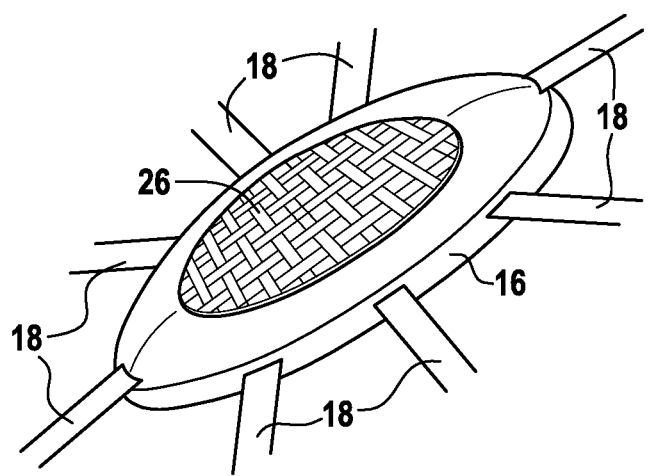
FIG. 3 shows a perspective view of the exemplary remote control of FIG. 2.

As shown in FIG. 3, the connecting stretch sensors 18 may be radially disposed around the 3-D shaped object 16.

As a non-limiting example, the 3-D shaped object 16 may be connected to the structure 20 by eight connecting stretch sensors 18 disposed radially around the 3-D shaped object 16.

As shown in FIG. 3, the weaved stretch sensors 26 may be formed by stretch sensors weaved with one another, i.e., some stretch sensors 26 may be aligned in one direction and weaved with other stretch sensors 26 aligned in another direction.

The weaved stretch sensors 26 may be connected to the control unit 40.

As shown in FIGS. 5A, 6A and 7A, the shape of the 3-D shaped object is not limited to a symmetrical regular shape.

Figure 10:
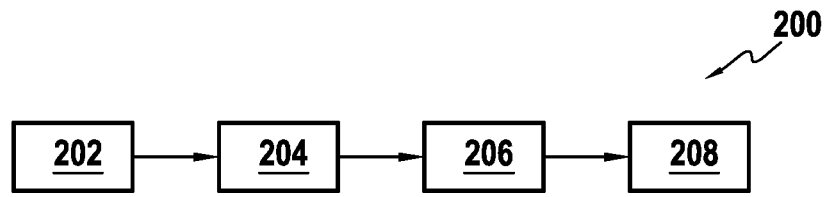
FIG. 10 shows a flow chart of the method according to embodiments of the present disclosure.

FIG. 10 shows a flow chart of a method 200 of remote control of a display of the automotive vehicle 100 according to embodiments of the present disclosure.

The method 200 may include a step 202 of grasping the 3-D shaped object 16 through the stretch fabric layer 22, for example to move a pointer on the display.

The method 200 may include a step 204 of deforming the connecting stretch sensors 18 by interacting with the 3-D shaped object 16.

The method 200 may include a step 206 of collecting information on deformation of the connecting stretch sensors 18 by the control unit 40.

The method 200 may include a step 208 of sending collected information by the control unit 40 to a vehicle system 42 controlling the display.

The control unit 40 and the vehicle system 42 may be connected to one another and may exchange information, as shown in FIG. 2.

Figure 4:
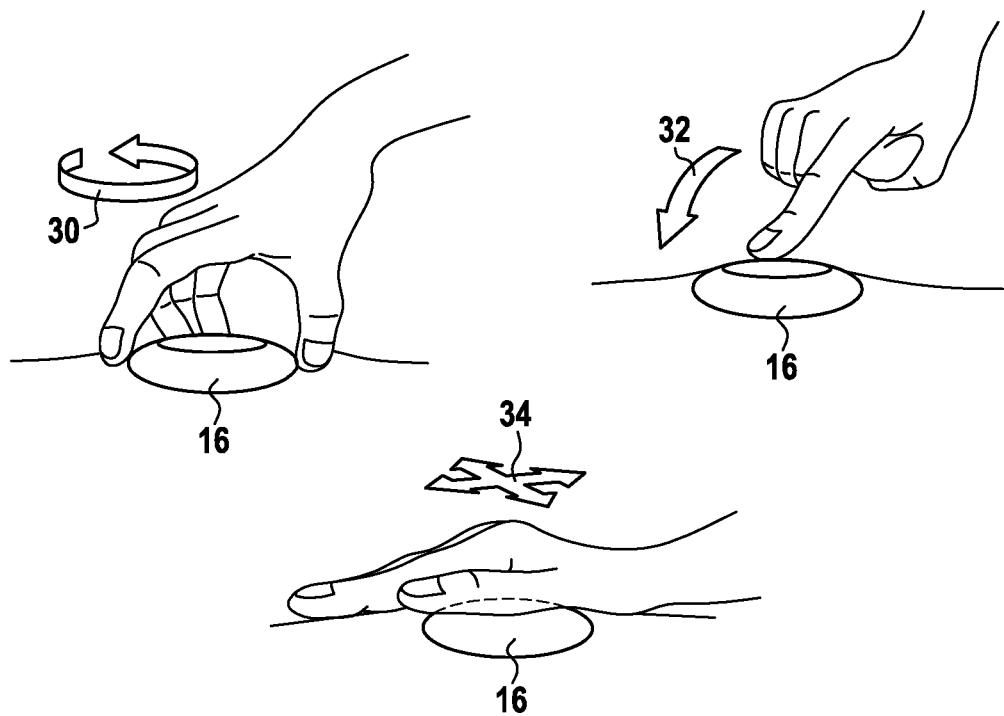
FIG. 4 shows interactions with the exemplary remote control of FIG. 2.

The step 204 of deforming the connecting stretch sensors 18 may include rotating the 3-D shaped object 16, as shown by arrow 30 in FIG. 4.

The step 204 of deforming the connecting stretch sensors 18 may include pressing the 3-D shaped object 16, as shown by arrow 32 in FIG. 4.

The step 204 of deforming the connecting stretch sensors 18 may include translating the 3-D shaped object 16, as shown by arrow 34 in FIG. 4.

The method 200 may include a step 204 of deforming the weaved stretch sensors 26 by interacting with the 3-D shaped object 16.

Figure 8A:
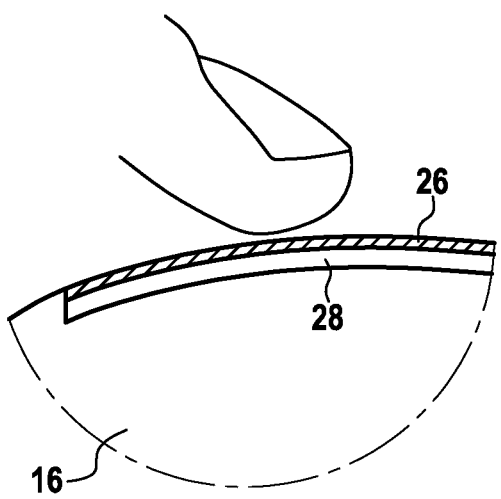
FIGS. 8-9 show interactions with the exemplary remote control of FIG. 2.
Figure 8B:
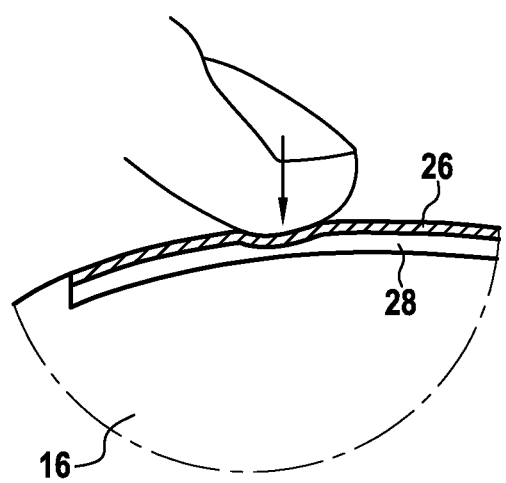

The step 204 of deforming the weaved stretch sensors 26 may include pressing the 3-D shaped object 16, as shown in FIGS. 8A, 8B.

In FIG. 8A, the remote control 14 is presented before the deformation is applied. In FIG. 8B, the remote control 14 is presented during the application of the deformation.

Figure 9:
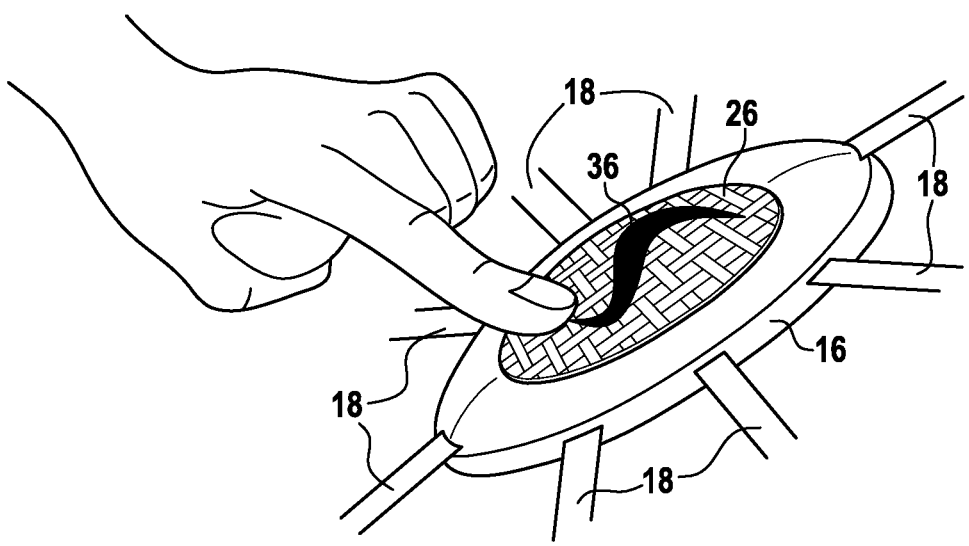

The step 204 of deforming the weaved stretch sensors 26 include pressing the 3-D shaped object 16, as shown in FIG. 9, where movement of a finger of a user on the weaved stretch sensors 26 may be continuous while moving on the surface of the weaved stretch sensors 26.

For better understanding of the interaction between the user and the remote control 14, the stretchable fabric part 12 has been omitted from FIGS. 3, 4, 8 and 9.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A remote control for an automotive vehicle, the remote control comprising:
   a 3-D shaped object;
   a plurality of stretch sensors connecting the 3-D shaped object to a structure of the automotive vehicle; and
   a control unit configured to collect information from the stretch sensors, wherein:
   the remote control is configured to control a display of the automotive vehicle,
   the remote control is configured to be integrated in a stretchable fabric part of an interior of the vehicle, and
   the stretch sensors are radially disposed around the 3-D shaped object and are spaced from each other in a circumferential direction.

2. The remote control according to claim 1, wherein the 3-D shaped object is sandwiched between two stretch fabric layers.

3. The remote control according to claim 1, wherein:
   the 3-D shaped object comprises a recess, and
   the remote control further comprises weaved stretch sensors forming a weaving of stretch sensors which covers said recess so as to allow deformation of the weaved stretch sensors into the recess, the control unit being configured to collect information from the weaved stretch sensors.

4. An automotive vehicle comprising:
   a remote control; and
   a display, the remote control comprising:

a 3-D shaped object,
a plurality of stretch sensors connecting the 3-D shaped object to a structure of the vehicle, and
a control unit configured to collect information from the stretch sensors, wherein:
the remote control is configured to control the display,
the remote control is integrated in a stretchable fabric part of an interior of the vehicle, and
the stretch sensors are radially disposed around the 3-D shaped object and are spaced from each other in a circumferential direction.

5. The automotive vehicle according to claim 4, wherein the remote control is integrated in an armrest.

6. The automotive vehicle according to claim 4, wherein the remote control is integrated in a center console.

7. The automotive vehicle according to claim 4, wherein the 3-D shaped object is sandwiched between two stretch fabric layers.

8. The automotive vehicle according to claim 4, wherein:
the 3-D shaped object comprises a recess, and
the remote control further comprises weaved stretch sensors forming a weaving of stretch sensors which covers said recess so as to allow deformation of the weaved stretch sensors into the recess, the control unit being configured to collect information from the weaved stretch sensors.

9. A method of remote control of a display of an automotive vehicle, the remote control comprising a 3-D shaped object, a plurality of stretch sensors connecting the 3-D shaped object to a structure of the automotive vehicle and a control unit configured to collect information from the stretch sensor, the remote control being integrated in a stretchable fabric part of an interior of the vehicle, and the stretch sensors being radially disposed around the 3-D shaped object and spaced from each other in a circumferential direction, the method comprising:
grasping the 3-D shaped object;
deforming the stretch sensors by interacting with the 3-D shaped object;
collecting information on deformation of the stretch sensors by the control unit;
sending collected information by the control unit to a vehicle system controlling the display.

10. The method according to claim 9, wherein deforming the stretch sensors comprises rotating the 3-D shaped object.

11. The method according to claim 9, wherein deforming the stretch sensors comprises pressing the 3-D shaped object.

12. The method according to claim 9, wherein deforming the stretch sensors comprises translating the 3-D shaped object.

* * * * *